United States Patent
Sonoi et al.

[11] Patent Number: 5,824,749
[45] Date of Patent: Oct. 20, 1998

[54] FLUORINE-CONTAINING ELASTOMER COMPOSITION

[75] Inventors: Takehiro Sonoi; Haruyoshi Tatsu, both of Ibaraki, Japan; Lev Solomonovich, deceased, late of Moscow, Russian Federation, by Elena N. German, executrix; Valerii Romanovich Polishchuk, deceased, late of Lod, Israel, by Margarita Polishchuk, executrix; Satoru Saito, Kitaibaraki, Japan

[73] Assignee: Nippon Mektron, Limited, Tokyo, Japan

[21] Appl. No.: 749,151

[22] Filed: Oct. 18, 1996

Related U.S. Application Data

[63] Continuation-in-part of Ser. No. 550,810, Oct. 31, 1995, Pat. No. 5,672,758.

[30] Foreign Application Priority Data

Oct. 4, 1994 [JP] Japan ................................. 6-266247

[51] Int. Cl.$^6$ ................................. C08F 8/32; C08F 8/34
[52] U.S. Cl. .................. 525/351; 524/186; 525/350; 525/374; 525/379; 525/382; 525/248; 525/253
[58] Field of Search ................... 525/351, 350, 525/382; 526/248; 524/186

[56] References Cited

U.S. PATENT DOCUMENTS

| | | |
|---|---|---|
| 3,114,778 | 12/1963 | Fritz et al. . |
| 3,546,186 | 12/1970 | Gladding et al. . |
| 3,852,326 | 12/1974 | Nottke . |
| 3,933,767 | 1/1976 | Nottke . |
| 4,138,426 | 2/1979 | England . |
| 4,281,092 | 7/1981 | Breazeale . |
| 4,525,539 | 6/1985 | Feiring ................... 525/326.3 |
| 5,223,599 | 6/1993 | Gajewski . |

FOREIGN PATENT DOCUMENTS

| | | |
|---|---|---|
| 0 606 883 Ai | 1/1994 | European Pat. Off. . |
| 705873 | 4/1996 | European Pat. Off. . |
| 59-109546 | 6/1984 | Japan . |

OTHER PUBLICATIONS

*Comptes Rendus Hebdomadaires Des Seances De L'academie Des Sciences*, A Bouanne et al., Chimie Macromoléculaire, vol. 279, No. 5. 1974, pp. 187–190.
*Chemical Abstracts*, vol. 117, No. 12, 1992, Columbus, Ohio, US; abstract No. 113668b, *abstract*.

*Primary Examiner*—Fred Zitomer
*Attorney, Agent, or Firm*—Barnes & Thornburg

[57] ABSTRACT

A fluorine-containing elastomer composition, which comprises a terpolymer of tetrafluoroethylene, perfluoro(lower alkyl vinyl ether) or perfluoro (lower alkoxy-lower alkyl vinyl ether) and cross-linkable cyano group-containing (perfluorovinylether), and a bis(aminothiophenol) compound represented by the following general formula as a cross-linking agent:

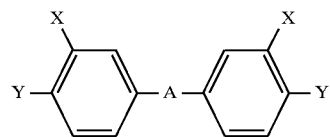

wherein A is an alkylidene group having 1 to 6 carbon atoms, a perfluoroalkylidene group having 1 to 10 carbon atoms, a $SO_2$ group, an O atom, a CO group or a carbon-carbon bond capable of directly bonding two benzene rings and one of X and Y is an amino group, while the other is a mercapto group, can produce cross-linked fluororubber moldings having an improved compression set.

5 Claims, No Drawings

FLUORINE-CONTAINING ELASTOMER COMPOSITION

RELATED APPLICATIONS

The present Application is a Continuation-In-Part of U.S. patent application Ser. No. 08/550,870, now U.S. Pat. No. 5,672,758, filed Oct. 31, 1995.

BACKGROUND OF THE INVENTION

1. Field of the Invention

The present invention relates to a fluorine-containing elastomer composition, and more particularly to a cross-linkable composition of fluorine-containing elastomer having cyano groups as cross-linkable groups.

2. Related Prior Art

JP-A-59-109546 discloses a fluorine-containing elastomer composition which comprises a terpolymer of tetrafluoroethylene, perfluoro(methyl vinyl ether) and cyano group-containing (perfluorovinylether) represented by the following general formula:

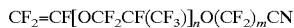

wherein n: 1~2 and m: 1~4 and a bis(aminophenyl) compound represented by the following general formula as a cross-linking agent:

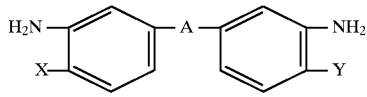

wherein A is an alkylidene group having 1 to 6 carbon atoms, a perfluoroalkylidene group having 1 to 10 carbon atoms, a $SO_2$ group, an O atom, a CO group or a carbon—carbon bond capable of directly bonding two benzene rings, and X and Y are hydroxyl groups or amino groups. However, such use of bis(diaminophenyl) compound bis(aminophenol) compound still has a room for improvement in the compression set.

SUMMARY OF THE INVENTION

An object of the present invention is to provide a fluorine-containing elastomer composition capable of producing cross-linked fluororubber moldings having an improved compression set, which contains a bis(aminothiophenol) compound as a cross-linking agent for a fluorine-containing elastomer having cyano groups as cross-linkable groups.

According to the present invention, there is provided a fluorine-containing elastomer composition, which comprises a terpolymer of tetrafluoroethylene, perfluoro(lower alkyl vinyl ether) or perfluoro(lower alkoxy-lower alkyl vinyl ether) and cross-linkable cyano group-containing (perfluorovinylether) and a bis(aminothiophenol) compound represented by the following general formula as a cross-linking agent:

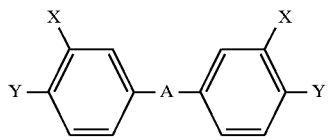

wherein A is an alkylidene group having 1 to 6 carbon atoms, a perfluoroalkylidene group having 1 to 10 carbon atoms, a $SO_2$ group, an O atom, a CO group or a carbon—carbon bond capable of directly bonding two benzene rings and one of X and Y is an amino group, while the other is a mercapto group.

DETAILED DESCRIPTION OF THE INVENTION

The terpolymer of tetrafluoroethylene, perfluoro(lower alkyl vinyl ether) or perfluoro(lower alkoxy-lower alkyl vinyl ether) and cyano group-containing (perfluorovinylether) for use in the present invention is a copolymer comprising about 30 to about 70% by mole of tetrafluoroethylene, about 65 to about 25% by mole of perfluoro(lower alkyl vinyl ether) or perfluoro(lower alkoxy-lower alkyl vinyl ether) and about 0.1 to about 5% by mole of cyano group-containing (perfluorovinylether) as a cross-linking site comonomer, the sum total of comonomers being 100% by mole.

As the perfluoro(lower alkyl vinyl ether), perfluoro(methyl vinyl ether) is usually used. As the perfluoro(lower alkoxy-lower alkyl vinyl ether), the following compounds are used:

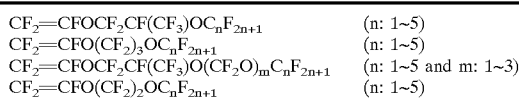

Among them, compounds whose $C_nF_{2n+1}$ group is a $CF_3$ group are preferably used.

As the cyano group-containing (perfluorovinylether) capable of providing cross-linkable groups in the terpolymer, the following compounds are used:

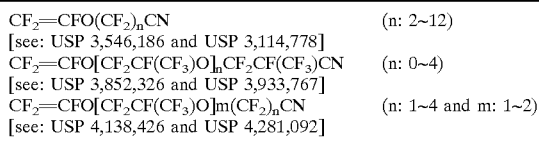

The terpolymer can be further copolymerized with various fluoroolefins or vinyl compounds in such a degree as not to inhibit the copolymerization reaction and deteriorate physical properties of vulcanized products, for example, not more than about 20% by mole on the basis of the terpolymer. Fluoroolefins for use in the present invention include, for example, vinylidene fluoride, monofluoroethylene, trifluoroethylene, trifluoropropylene, pentafluoropropylene, hexafluoropropylene, hexafluoroisobutylene, chlorotrifluoroethylene, dichlorodifluoroethylene, etc. Vinyl compounds for use in the present invention include, for example, ethylene, propylene, 1-butene, isobutylene, methyl vinyl ether, ethyl vinyl ether, butyl vinyl ether, cyclohexyl vinyl ether, vinyl acetate, vinyl propionate, vinyl chloride, vinylidene chloride, trifluorostyrene, etc.

About 0.5 to about 5 parts by weight, preferably about 1 to about 2 parts by weight, of bis(aminothiophenol) compound represented by the foregoing general formula is added to 100 parts by weight of the terpolymer.

Bis(aminothiophenol) compounds used in the present invention can be produced according to the process disclosed in the U.S. Pat. No. 3,424,720, the complete disclosure of which is hereby expressly incorporated by reference.

Others of the bis(aminothiophenol) compounds can be produced according to a synthesis process which involves the following steps:

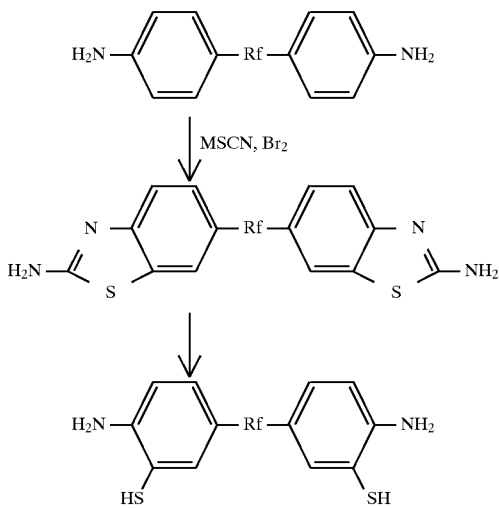

Reaction of [III]→[II]:

a solution of bromine in glacial acetic acid is dropwise added to a solution of a bisaminophenyl compound [III] and an alkali metal thiocyanate such as potassium thiocyanate or sodium thiocyanate in excess of an equimolar amount to that of bisaminophenyl compound [III] in glacial acetic acid at room temperature with stirring and then water is added thereto. The mixture is heated up to the boiling point and then cooled and filtered. Sodium hydrogen carbonate is added to the filtrate to obtain a bisaminobenzothiazole compound [II] as precipitates. It seems that bromine acts as an oxidizing agent to make the triocyanate addition reaction with the aromatic nucleus, followed by a nucleophilic ring-closing reaction between the thiocyano group and the amino group.

Generally, 2,2-bis(4-aminophenyl) hexafluoropropane can be used as a bisaminophenyl compound [III].

Reaction of [II]→[1]:

The thus obtained bisaminobenzothiazole compound [II] is added to an aqueous solution of an alkali metal hydroxide such as potassium hydroxide or sodium hydroxide in an inert gas atmosphere at a temperature of about 110° to about 130° C., and then the mixture is slowly heated to about 260° C. to conduct reaction until generation of ammonia is ceased. Then, the temperature is lowered down to about 200° C. After addition of water thereto, the reaction mixture is cooled down to room temperature. Then, an aqueous dilute solution of an inorganic acid such as a concentrated hydrochloric acid is added to the reaction mixture to make pH 6, and then glacial acetic acid is added thereto to obtain a bis(aminothiophenol) compound [1] as precipitates.

The thus obtained bis(aminothiophenol) compound or its salt can be used according to the present invention.

The fluorine-containing elastomer composition comprising the above-mentioned components as essential ones can further contain an inorganic filler such as carbon black, silica, etc., an acid acceptor such as oxide, hydroxide or stearate of a divalent metal, litharge, etc., a vulcanization aid such as Crown ether, quaternary ammonium salt, quaternary phosphonium salt, etc., and other additives, as desired. The composition can be prepared by kneading in rolls, kneader, Bambury mixer, etc. Cross-linking of the composition is carried out by heating at about 160° to about 250° C. for about 10 to about 60 minutes. Secondary vulcanization, when desired, is preferably carried out at about 150° to about 280° C. for not more than about 30 hours in an inert atmosphere such as a nitrogen atmosphere.

By using a bis(aminothiophenol) compound as a cross-linking agent for a fluorine-containing elastomer having cyano groups as cross-linkable groups, a fluorine-containing elastomer composition capable of producing cross-linked moldings having a largely improved compression set can be obtained.

PREFERRED EMBODIMENTS OF THE INVENTION

The present invention will be described in detail below, referring to Examples.

REFERENCE EXAMPLE 1

200 ml of distilled water, 2.5 g of ammonium perfluorooctanoate and 4.4 g of $Na_2HPO_4 \cdot 12H_2O$ were charged into a stainless steel autoclave having a net capacity of 500 ml, and then the inside gas was replaced with a nitrogen gas. Then the autoclave was subjected to pressure reduction and cooled to about −50° C. Then the following compounds were successively charged into the autoclave:

| | |
|---|---|
| Perfluoro (5-cyanopentyl vinyl ether) [FCVE] | 6.4 g |
| Perfluoro(methyl vinyl ether) [FMVE] | 68 g |
| Tetrafluoroethylene [TFE] | 32 g |

After heating the autoclave to 80° C., 25 ml each of aqueous solutions containing 0.75 g of sodium sulfite and 3.75 g of ammonium persulfate, respectively, were charged into the autoclave to initiate polymerization reaction. After the polymerization reaction was continued for 20 hours, unreacted gases were purged from the autoclave and the resulting aqueous latex was taken out of the autoclave, salted out with an aqueous 10% sodium chloride solution and dried, whereby 44 g of white rubbery terpolymer A was obtained.

It was found by infrared absorption analysis that the terpolymer A had a copolymer composition of 62.0% by mole of TFE, 37.0% by mole of FMVE and 1.0% by mole of FCVE (characteristic absorption of nitrile groups: 2268 $cm^{-1}$).

REFERENCE EXAMPLE 2

Polymerization reaction was carried out in the same manner as in Reference Example 1 except that 9 g of perfluoro(8-cyano-3,7-dioxanonene-1)[CNVE] was used in place of FCVE, whereby 35 g of white rubbery terpolymer B was obtained. The terpolymer B had a copolymer composition of 61.0% by mole of TFE, 38.2% by mole of FMVE and 0.8% by mole of CNVE.

EXAMPLES 1 TO 2 AND COMPARATIVE EXAMPLES 1 TO 2

The following components were kneaded in a double roll rubber mill and then subjected to primary vulcanization at 160° C. for 30 minutes and secondary vulcanization at 230° C. for 22 hours in a nitrogen gas atmosphere:

| | Parts by Weight |
|---|---|
| Terpolymer A | 100 |
| Cross-linking agent I (Ex. 1) | 1 |
| Cross-linking agent II (Ex. 2) | 1 |

Normal state physical properties of the vulcanized products obtained in Examples 1 to 4 and Comparative Examples 1 to 4 were measured according to JIS K-6301 and compression sets of O-rings thereof were determined according to ASTM D-395, method B. Results are shown in the following Table.

TABLE

| Measurement Item | Ex. 1 | Ex.2 | Comp. Ex. 1 | Comp. Ex. 2 | Ex. 3 | Ex. 4 | Comp. Ex. 3 | Comp. Ex. 4 |
|---|---|---|---|---|---|---|---|---|
| [Normal state physical properties] | | | | | | | | |
| Hardness (JIS-A) | 73 | 74 | 75 | 73 | 73 | 75 | 74 | 74 |
| 100% Modulus (kg/cm$^2$) | 70 | 71 | 71 | 70 | 70 | 75 | 74 | 70 |
| Tensile strength (kg/cm$^2$) | 175 | 173 | 170 | 165 | 162 | 170 | 173 | 149 |
| Elongation (%) | 140 | 140 | 130 | 130 | 165 | 140 | 159 | 165 |
| [Compression set: %] | | | | | | | | |
| 200° C. for 70 hours | 23 | 24 | 32 | 33 | 14 | 24 | 15 | 26 |
| 275° C. for 70 hours | — | — | — | — | 16 | 26 | 19 | 35 |

-continued

| | Parts by Weight |
|---|---|
| Cross-linking agent III (Comp. Ex. 1) | 1 |
| Cross-linking agent IV (Comp. Ex. 2) | 1 |
| Dicyclohexyl-18-Crown-6 | 0.5 |
| Litharge (lead oxide) | 2 |
| MT carbon black | 10 |

Note:

Cross-linking agent I:
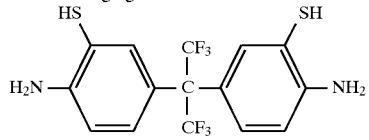

Cross-linking agent II:
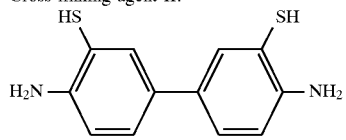

Cross-linking agent III:
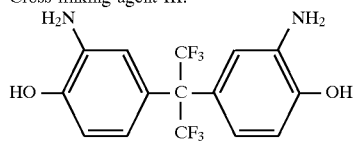

Cross-linking agent IV:
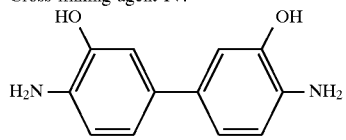

EXAMPLES 3 TO 4 AND COMPARATIVE EXAMPLES 3 TO 4

Operations were carried out in the same manner as in Examples 1 to 2 and Comparative Examples 1 to 2, except that the terpolymer B was used in place of the terpolymer A.

The following examples illustrate how certain bis (aminothiophenol) compounds of the present invention are produced.

EXAMPLE 5

A solution containing 92.8 g (0.58 moles) of bromine in 20 ml of glacial acetic acid was dropwise added to a solution containing 80 g (0.24 moles) of 2,2-bis(4-aminophenyl)-hexafluoropropane and 120 g (1.24 moles) of potassium thiocyanate in 280 ml of glacial acetic acid with stirring over one hour. After the dropwise addition, the mixture was stirred for further 2 hours and left standing overnight. Then, 1 liter of water was added thereto, and the mixture was heated to the boiling point and then cooled and filtered.

Solium hydrogen carbonate was added to the filtrate, and the resulting precipitates were recovered by filtration, washed with water and dried, whereby 102 g of desired 2,2-bis(5-amino-4,6-benzothiazolyl) hexafluoropropane was obtained (yield: 95%).

Melting point: 262°~266° C.

Elemental analysis ($C_{17}H_{10}F_6N_4S_2$):

Calculated: C 45.53%, H 2.33%, F 25.45%, N 12.50%, S 14.28%

Found: C 45.23%, H 2.35%, F 24.87%, N 11.74%, S 13.80%

Mass spectrum: 448 (relative intensity 86)M+
379(100)[M—CF$_3$]+
310(15)[M—2CF$_3$]+

$^{19}$F NMR (δ: DMSO): −15.2(s)(CF$_3$COOH base)
$^1$H NMR (δ: DMSO): H(1), H(2)=6.32 ppm(AB q.)
$J_{AB}$=7.9 Hz
H(3)=6.72 ppm(br. s.)
H(4)=6.8 ppm(br. s.)
H(1):H(2):H(3):H(4)=1:1:1:2

120 g (2.14 moles) of potassium hydroxide and 16 ml of water were charged into a round bottom flask and heated at 120° C. in an argon atmosphere while stirring the mixture until potassium hydroxide was dissolved into water. Then, 44.8 g (0.1 mole) of 2,2-bis(5-amino-4,6-benzothiazolyl) hexafluoropropane was added thereto also in the argon atmosphere with stirring, and the mixture was slowly heated up to 250° C., and then stirred for further 20 minutes. Then, the mixture was heated up to 260° C. and can be kept at that temperature for about 10 minutes until generation of ammonia was completely ceased to conduct the reaction. Then, the reaction temperature was lowered down to 200° C., and 600 ml of deaerated water was slowly added thereto. Then, the mixture was cooled down to 15° C. An aqueous dilute solution containing 240 ml of concentrated hydrochloric acid in 240 ml of deaerated water was added thereto to make pH 6, and then 40 ml of glacial acetic acid was slowly added thereto. The resulting precipitates were recovered by filtration, washed with water and dried, whereby 37 g of 2,2-bis(4-amino-3-mercaptophenyl)hexafluoropropane was obtained as the ultimate product (yield:93%).

Melting point: 85° C.

Elemental analysis ($C_{15}H_{12}F_6N_2S_2$):

Calculated: C 45.23%, H 3.01%, F 28.64%, N 7.03%, S 16.08%

Found: C 45.03%, H 2.88%, F 25.37%, N 6.79%, S 15.98%

Mass spectrum: 398M+, 364[M—$H_2S$]+, 329[M—$CF_3$]+, 295[M—$H_2S$—$CF_3$]

$^{19}F$ NMR (δ: DMSO·$d_6$): −14.55 ppm(s) ($CF_3COOH$ base)

$^1H$ NMR (δ): H(1), H(2)=6.05 ppm(AB q.)

$J_{AB}$=9 Hz

H(HS)=4.8 ppm

H($H_2N$)=6.14 ppm

What is claimed is:

1. A fluorine-containing elastomer composition, which comprises a terpolymer of tetrafluoroethylene, perfluoro (lower alkyl vinyl ether) or perfluoro(lower alkoxy-lower alkyl vinyl ether) and a cross-linkable cyano group-containing (perfluorovinylether) selected from:

$CF_2=CFO(CF_2)_nCN$ where n is an integer from 2 to 12, and $CF_2=CFO(CF_2)_3OCF(CF_3)CN$, and a bis(aminothiophenol) compound represented by the following general formula as a cross-linking agent:

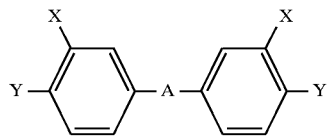

wherein A is an alkylidene group having 1 to 6 carbon atoms, a perfluoroalkylidene group having 1 to 10 carbon atoms, a $SO_2$ group, an O atom, a CO group or a carbon-carbon bond capable of directly bonding two benzene rings and one of X and Y is an amino group, while the other is a mercapto group.

2. A fluorine-containing elastomer composition according to claim 1, wherein the terpolymer is a copolymer comprising about 30 to about 70% by mole of tetrafluoroethylene, about 65 to about 25 % by mole of perfluoro(lower alkyl vinyl ether) or perfluoro(lower alkoxy-lower alkyl vinyl ether) and about 0.1 to about 5% by mole of cyano group-containing (perfluorovinylether), the sum total of comonomers being 100% by mole.

3. A fluorine-containing elastomer composition according to claim 1, wherein the terpolymer contains not more than 20% by mole of other fluoroolefin or other vinyl compound on the basis of the terpolymer.

4. A fluorine-containing elastomer composition according to claim 1, wherein the bis(aminothiophenol) compound is:

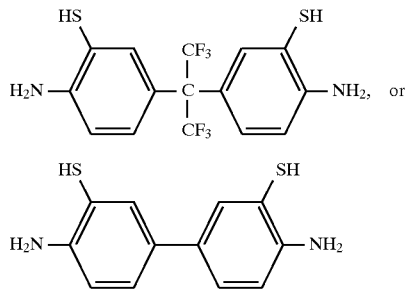

5. A fluorine-containing elastomer composition according to claims 1, wherein about 0.5 to about 5 parts by weight of the bis(aminothiophenol) compound is used per 100 parts by weight of the terpolymer.

* * * * *